United States Patent [19]
Rathnasabapathy et al.

[11] Patent Number: 6,097,960
[45] Date of Patent: *Aug. 1, 2000

[54] SYSTEM AND METHOD FOR APPLICATION LOCATION REGISTER ROUTING IN A TELECOMMUNICATION NETWORK

[75] Inventors: Rajan Rathnasabapathy, Plano; Russell R. Cook, Garland, both of Tex.

[73] Assignee: Alcatel USA Sourcing, L.P., Plano, Tex.

[*] Notice: This patent is subject to a terminal disclaimer.

[21] Appl. No.: 09/467,659

[22] Filed: Dec. 20, 1999

Related U.S. Application Data

[63] Continuation of application No. 08/964,599, Nov. 6, 1997, Pat. No. 6,006,098.

[51] Int. Cl.$^7$ .................................................. H04Q 7/20
[52] U.S. Cl. .......................... 455/461; 455/433; 379/219
[58] Field of Search ................................... 455/422, 433, 455/507, 560, 461, 412, 414, 446, 445, 466; 370/522, 524; 379/207, 210–212, 219–221, 229–230, 112–115, 242–243

[56] References Cited

U.S. PATENT DOCUMENTS

| | | | |
|---|---|---|---|
| 5,586,177 | 12/1996 | Farris et al. | 379/230 |
| 5,598,464 | 1/1997 | Hess et al. | 379/213 |
| 5,878,129 | 3/1999 | Figurski et al. | 379/230 |

FOREIGN PATENT DOCUMENTS 0317170  5/1989  European Pat. Off. ........ H04L 11/20

OTHER PUBLICATIONS

L. Smith, "Number Portability Pileup", Telephony, vol. 232, No. 1, Jan. 6, 1997, pp. 22–24.

C. Buckles, "Very High Capacity Signaling Transfer Point for Intelligent Network Services", Digital Technology—Spanning the Universe, Philadelphia, Jun. 12–15, 1988, vol. 3, No. 2, pp. 1308–1311.

*Primary Examiner*—Reinhard J. Eisenzopf
*Assistant Examiner*—Marsha D. Banks-Harold
*Attorney, Agent, or Firm*—Baker Botts L.L.P.

[57] ABSTRACT

A system and method for application location register routing at a signal transfer point (26) are provided. The signal transfer point (26) includes processor clusters (64, 66, 68) and databases (236, 238) for processing queries including global title translation, local number portability, and application location register routing. A query message is received by the signal transfer point (26), a first database residing in the signal transfer point (26) is accessed to determine the location of a second database (238) also residing in the signal transfer point for processing the query message. The second database (238) is then accessed to obtain the network address of a home location register or short message service center, which is then used to deliver the query message to the network node specified by the network address.

20 Claims, 4 Drawing Sheets

SYSTEM AND METHOD FOR APPLICATION LOCATION REGISTER ROUTING IN A TELECOMMUNICATION NETWORK

This application is a continuation of U.S. application Ser. No. 08/964,599, filed Nov. 6, 1997, now U.S. Pat. No. 6,006,098.

TECHNICAL FIELD OF THE INVENTION

This invention is related in general to the field of telecommunications systems. More particularly, the invention is related to a system and method for Application Location Register (ALR) routing in a telecommunications network.

BACKGROUND OF THE INVENTION

Wireless or Personal Communication Service (PCS) providers have been, until recently, able to store and maintain subscriber information and current location data on only one home location register (HLR). However, due to the escalating number of subscribers and the rapid expansion of the wireless (PCS) communications networks, it has become necessary to employ multiple home location registers to accommodate the growth.

By using multiple home location registers in the wireless communications network, it becomes necessary to devise a system and method to route the query messages and location updates to the proper home location register. A proposed solution is to provide a database in the service control point (SCP) in the telecommunications network, which maintains routing information. However, a serious drawback with this solution is the additional traffic it may cause in the signaling system no. 7 (SS7) network by routing these additional queries from the mobile switching centers (MSCs) to the service transfer points (STPs) and then to the service control point. These queries add to the existing signaling traffic that accomplish toll-free calling, number portability, and other global title translation (GTT) queries to provide services such as line information database (LIDB) services, switch based services (SBS) such as certain Bellcore's CLASS® services, calling name (CNAM) delivery, and interswitch voice messaging (ISVM). Due to the anticipated large overall query volume, the SS7 link set between the service control point and signal transfer point becomes a troublesome bottleneck, creating a potentially substantial negative impact to the network's ability to route calls and provide services.

SUMMARY OF THE INVENTION

Accordingly, a need has arisen for a solution to the application location register routing problem for multiple home location registers. The teachings of the present invention provides a system and method for application location register routing which addresses this problem.

In one aspect of the invention, a method for application location register routing in a signal transfer point in a wireless telecommunications network is provided. The method includes the steps of receiving a query message requesting for information related to a specific mobile telecommunications customer, decoding the query message and obtaining a translation type and a global title address therefrom, looking up the translation type in a first database residing in the signal transfer point and determining a location of a second database residing in the signal transfer point for processing the query message. Thereafter, at least a predetermined portion of the global title address is used to look up, in the second database residing in the signal transfer point, to obtain a network address of a destination for processing the query message. The query message is then forwarded to a network node in the wireless telecommunications network specified by the network address.

In another aspect of the invention, a system for application location register routing in a wireless telecommunications network includes a first cluster of processors adapted for receiving a query message requesting for information related to a specific mobile telecommunications customer, a first database being accessible by the first cluster of processors and having location information of a second database, and a second cluster of processors co-located with the first cluster of processors and being adapted for receiving at least a portion of the query message from the first cluster of processors. The second cluster of processors is dedicated to process application location register routing. A second database is accessible by the second cluster of processor and stores network addresses specifying the destinations of the query messages. The second cluster of processors are adapted to obtaining the network addresses from the second database and forwarding the network address to the first cluster of processors.

BRIEF DESCRIPTION OF THE DRAWINGS

For a better understanding of the present invention, reference may be made to the accompanying drawings, in which.

DETAILED DESCRIPTION OF THE INVENTION

Figure 1:
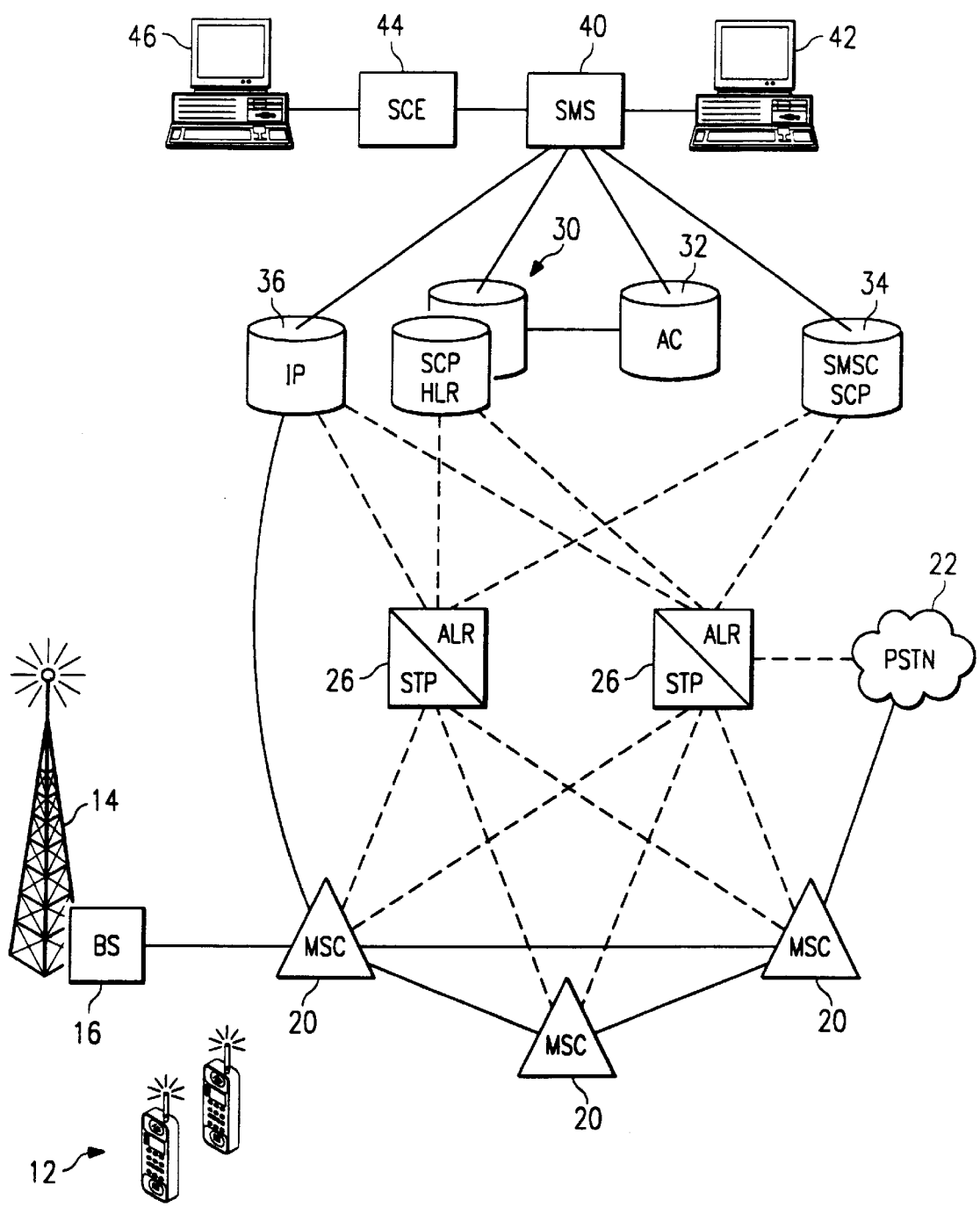
FIG. 1 is a simplified block diagram of a portion of an exemplary telecommunications network according to the teachings of the present invention.

The preferred embodiments of the present invention are illustrated in FIGS. 1–4, like reference numerals being used to refer to like and corresponding parts of the various drawings.

FIG. 1 is a block diagram of a telecommunications network 10 for wireless call delivery and services. Telecommunications network 10 is preferably constructed pursuant to the Advanced Intelligent Network (AIN) architecture. Telecommunications network 10 includes a number of wireless service subscribers 12 who are in communications with a base station (BS) 16 via a number of land-based transmission towers 14 and/or satellite-based wireless transponders (not shown). Base station 16 may be coupled to at least one mobile switching center (MSC) 20, which is further coupled to a network of mobile switching centers 20. Mobile switching centers 20 are further coupled to a pair of signal transfer points (STPs) 26 which each includes an application location register (SLR) subsystem. Signal transfer points 26 and mobile switching centers 20 may be coupled to a public switched telephone network 22.

Telecommunications network 10 further includes service control points (SCPs) 30 that may include multiple home location register (HLR) databases. Service control points 30 may be coupled to an authentication center (AC) database 32. A service management system (SMS) 40 is coupled to service control points 30, authentication center 32, a service control point having a short message service center (SMSC) database 34, and an intelligent peripheral (IP) 36. Short message service center 34 may support voice mail, email, paging, and other services supported by the mobile telecommunications network. A user interface 42 which may be a computer platform, workstation, or terminal, is coupled to service management system 40. A service creation environment (SCE) 44 is coupled service management system 40, and also may utilize a user interface 46.

Service control points 30 and 34 are coupled to signal transfer points 26 via signaling system no. 7 (SS7) link sets specified by the American National Standard Institute (ANSI). An SS7 link set may include up to sixteen 56 Kb/s links. Signal transfer points 26 are further interconnected to mobile switching centers 20 via SS7 link sets.

Signal transfer points 26 of the present invention may include global title translation (GTT) databases such as local number portability (LNP), line information (LIDB), switch based services, calling name (CNAM), and interswitch voice messaging (ISVM) databases containing routing data related to each service. In addition, when the wireless service provider requires the use of multiple home location registers, an application location register database is needed to identify the home location register that maintains a particular subscriber's service information.

A telecommunications service designer may design and implement a call service at service creation environment 44 via user interface 46. The service logic and database schema may then be downloaded to service management system 40 for distribution to other network components, such as intelligent peripheral 36, service control points 30 and 34, authentication center 32, etc. System management, maintenance and administration may be performed at service management system 40 via user interface 42.

In telecommunications network 10, calls may originate from a non-wireless telephone customer to another non-wireless telephone customer, from a wireless telephone customer to another wireless telephone customer, from a non-wireless telephone customer to a wireless telephone customer, and vice versa.

Figure 2:
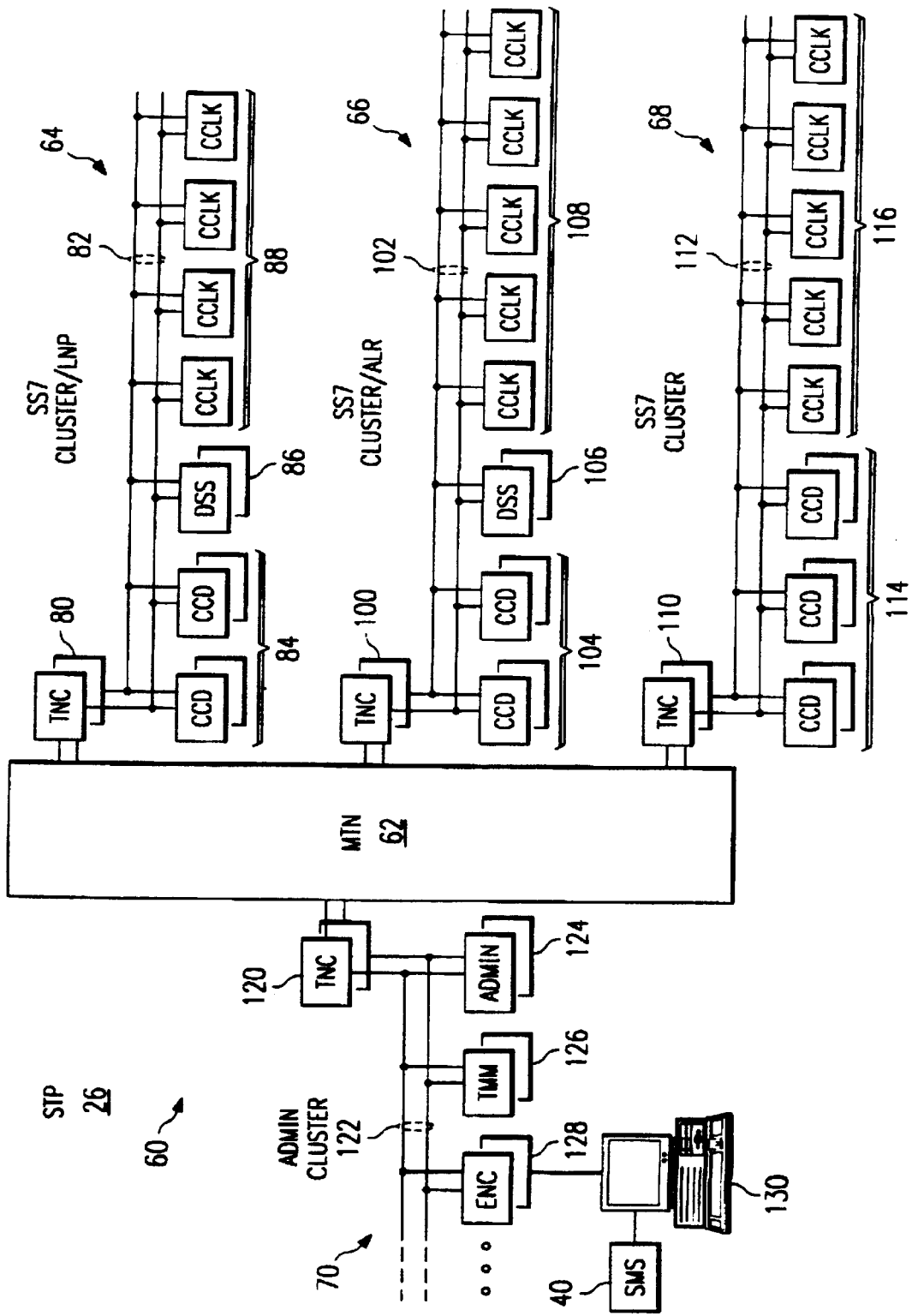
FIG. 2 is a simplified block diagram of an exemplary signal transfer point with an SS7 application location register subsystem according to the teachings of the present invention.

Referring to FIG. 2, a more detailed block diagram of a subsystem 60 of signal transfer point 26 with added database and processing units for application location register is shown. Signal transfer point 26 includes a message transport network (MTN) backbone 62 which provides communication between clusters of processors 64–70. One cluster of processors 70 may perform administration, maintenance, and communication functions for system 60. Other clusters 64–68 process SS7 signaling messages that are transmitted on SS7 link sets to signal transfer point 26. SS7 cluster 64 may be designated for local number portability, for example, which includes a transport node controller (TNC) 80 coupled to common channel distributors (CCDs) 84, a distributed SS7 services processor (DSS) 86, and common channel links (CCLKs) 88 via a network 82. A second SS7 cluster 66 may be devoted to application location registration and may similarly include a transport node controller 100 coupled to common channel distributors 104, a distributed SS7 services processor 106, and common channel links 108 via a network 102. System 60 may include additional SS7 clusters 68 for other global title translation processes or routing to processors within system 60, which may be similarly equipped with a transport node controller 110, common channel distributors 114, and common channel links 116, linked together by a network 112. It may be seen that transport node controllers, common channel distributors, and distributed SS7 services processors of each cluster are shown as processor pairs. The processor pairs may operate in standby or load sharing modes. The processors may also include fault tolerant multiprocessor engines with built-in redundancy.

Administration cluster 70 also includes a transport node controller 120 coupled to an administration processor 124, a traffic metering and measurement (TMM) processor 126, and an ethernet controller 128. Ethernet controller 128 may be coupled to a user interface or workstation 130 which is also coupled to service management system 40. Craft personnel may perform system maintenance and administrative functions via user interface 130 and administration cluster 70.

Figure 3:
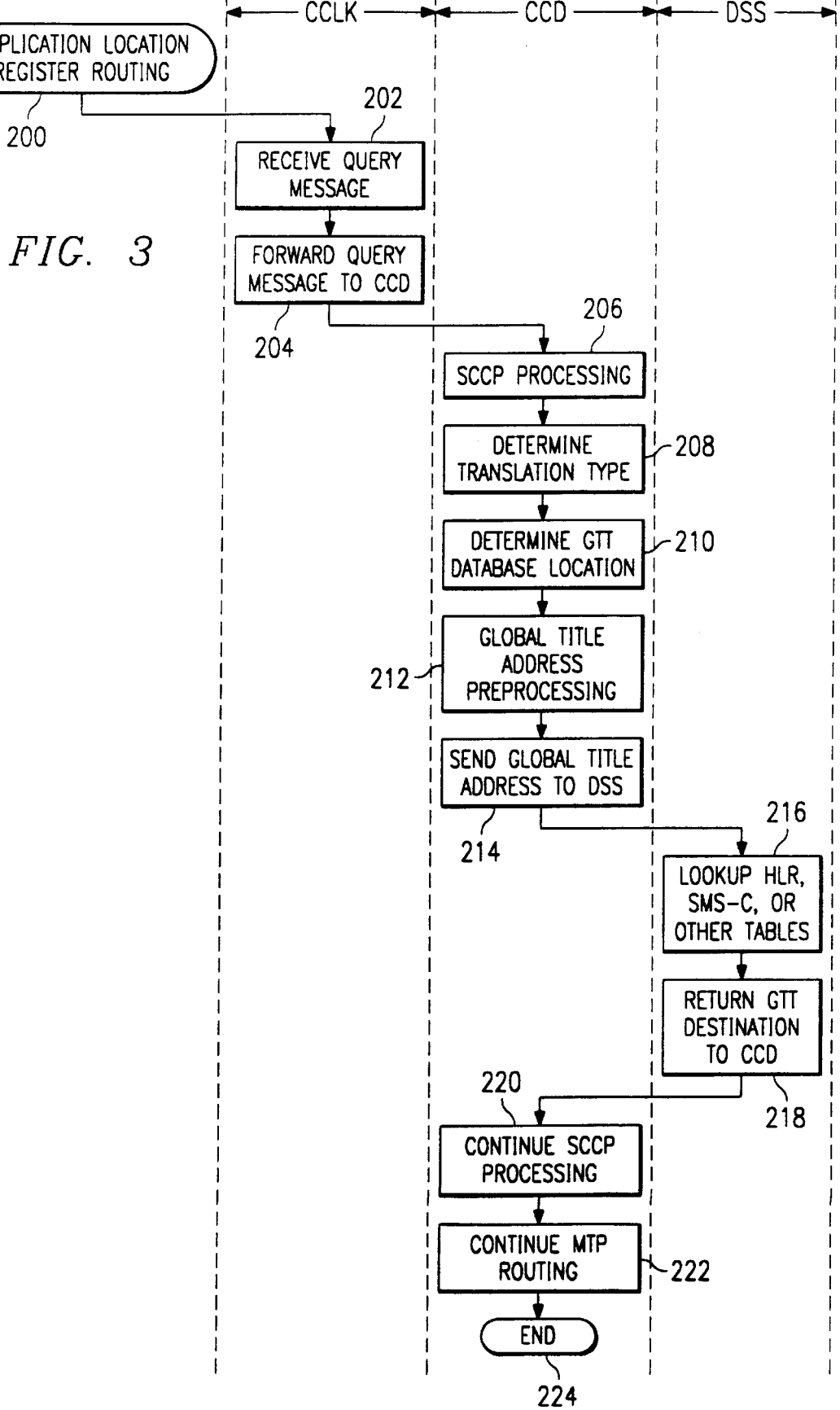
FIG. 3 is a simplified flowchart of an embodiment of an embodiment of an application location register process according to the teachings of the present invention.
Figure 4:
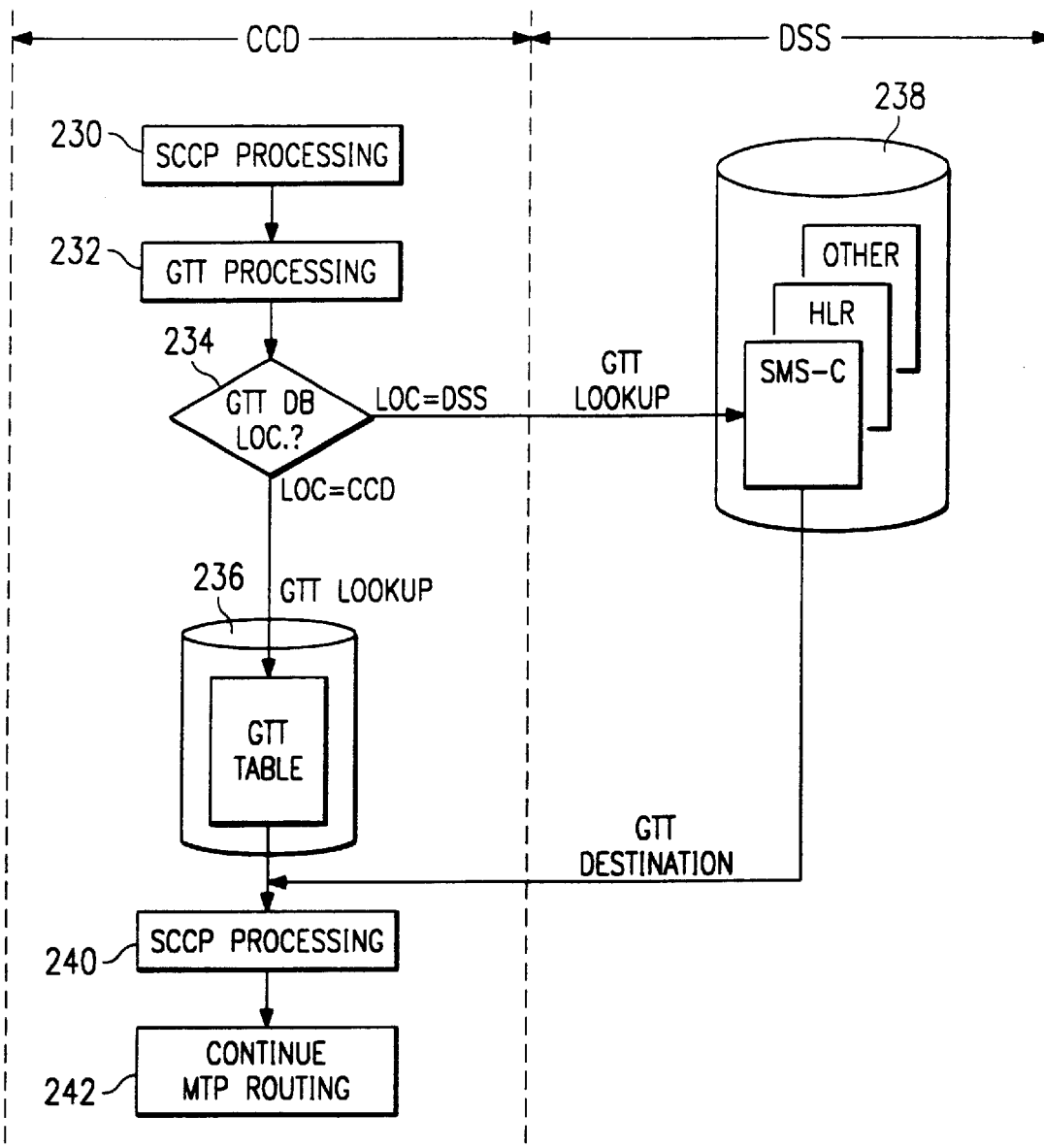
FIG. 4 is a simplified process flow diagram of an embodiment of application location register as part of a global title translation process according to the teachings of the present invention.

FIGS. 3 and 4 are a flowchart and a message flow diagram of the application location register routing process 200, respectively. An SS7 query message is first routed to a common channel link 116 of SS7 cluster 68, as shown in block 202 in FIG. 3. Common channel link 116 forwards the query message to a common channel distributor 114 of SS7 cluster 68, as shown in block 204. Common channel distributor 114 begins SCCP (signaling connection user part) processing and looks at the TCAP (transaction capabilities application part) portion of the query message, as shown in block 206. This is also shown in block 230 in FIG. 4. As part of the global title translation (block 232 in FIG. 4), the TCAP is decoded to determine the translation type, as shown in block 208. In particular, the global title address (GTA) in the SCCP called party address (CdPA) part of the query message is decoded to obtain the translation type and a 15-digit IMSI (international mobile subscriber identity; E.212 format) or an 11-digit MSISDN (mobile subscriber directory number; E.164 format) to perform the translation process. Generally, application location register routing uses the 15-digit IMSI-based addressing for mobile customer location updates, which is designated as translation type 9. The query messages for location updates are routed to the network node, typically a particular home location register, specified by the network address obtained in the translation process. MSISDN-based addressing is used for directing requests related to the send routing information procedure for terminating calls, which is translation type 10. The query messages for send routing information are routed to the network node (typically a particular home location register) of the specified network address obtained in the translation process. The forward short message requests may contain the MSISDN (translation type 12) or the IMSI (translation type 13). The query messages for forward short message are routed to a network node, typically a short message service center, based on the network address obtained in the translation process.

In FIGS. 3 and 4, based on the translation type, the location of the global title translation database is determined, as shown in block 210 in FIG. 3 and block 234 in FIG. 4. The database location may be obtained by referring to a lookup table or database which lists translation types and the corresponding database identifier or location. For application location register routing queries, the database location has been designated to be distributed SS7 services processor 106 of SS7 cluster 66, for example. Therefore, the query message or relevant portions thereof are forwarded to distributed SS7 services processor 106 of SS7 cluster 66. As shown in blocks 212 and 214, certain global title address preprocessing may be performed prior to forwarding the query to distributed SS7 services processor 106. For example, the global title address in the called party address portion of the message may be decoded to obtain the 11-digit MSISDN field for translation to the network address of the specific short message service center. The 11-digit global title address is a 10-digit NANP (North America number plan) with a "1" prefix (e.g. 1-NPA-NXX-XXXX) or an international 10-digit format with a prefix of "1" through "9". Depending on system design and implementation, the address preprocessing may further strip out one or more predetermined digits of the global title address (e.g. the leading "1") prior to forwarding it for further processing.

In distributed SS7 service processor 106, one or more tables or databases 238 are searched for the IMSI or MSISDN to determine the global title translation destination network address for the specified home location register or short message service center, or any other services associated with the mobile telecommunications subscription, as shown in blocks 216 and 218. Once the network address is obtained, it is returned to the common channel distributor to continue SCCP processing, as shown in block 220 (FIG. 3) and block 240 (FIG. 4) and to continue with message transfer part routing, as shown in block 222 (FIG. 3) and bloc 242 (FIG. 4).

To provision application location register routing on system 60, service management system commands are routed to workstation 130 in administration cluster 70 (FIG. 2) and ethernet controller 128. A processor in administration cluster 70, such as traffic metering and measurement processor 126 may then broadcast the updates to distributed SS7 service processor pairs 106 and store the update information in the databases or tables therein.

Constructed in this manner, the wireless PCS network may support multiple home location register, short message service center, and voice mail service platforms while minimizing the impact on mobile switching center nodes. The mobile customer initiated service queries are located and routed to the proper destination to update the mobile customer's location, send routing information, and forward short message. This enables mobile service providers the capability to expand the database capacities by adding multiple platforms to meet the rapid growth in subscriber numbers. Further, it may be seen that application location register routing is accomplished at the signal transfer point, which is only "one hop" away from the mobile switching centers. This dramatically cuts down on the number of SS7 links the query messages and destination responses must travel on to achieve application location register routing.

Although the present invention and its advantages have been described in detail, it should be understood that various changes, mutations, substitutions and alterations can be made therein without departing from the spirit and scope of the invention as defined by the appended claims.

What is claimed is:

1. A method for application location register routing processing, comprising the steps of:
   receiving a query message requesting for information related to a specific telecommunications customer from a query originator;
   decoding the query message and obtaining a translation type and a global title address therefrom;
   looking up the translation type in a first database;
   determining a location of a second database for processing the query message;
   looking up, using at least a predetermined portion of the global title address, in the second database a network address of a destination for processing the query message; and
   forwarding the query message to a network node specified by the network address.

2. The method, as set forth in claim 1, wherein the query message receiving step comprises the step of receiving a query message containing a location update of a telecommunications customer.

3. The method, as set forth in claim 1, wherein the query message receiving step comprises the step of receiving a send routing information query message.

4. The method, as set forth in claim 1, wherein the query message receiving step comprises the step of receiving a forward short message request.

5. The method, as set forth in claim 1, wherein the first database lookup step further comprises the step of looking up in the first database for a location of a processor having access to the second database.

6. The method, as set forth in claim 5, further comprising the step of routing the query message to the processor in response to the location obtained from the first database.

7. The method, as set forth in claim 5, further comprising the step of routing at least a predetermined portion of the query message to the processor in response to the location obtained from the first database.

8. The method, as set forth in claim 5, further comprising the step of routing at least the predetermined portion of the global title address to the processor in response to the location obtained from the first database.

9. The method, as set forth in claim 1, further comprising the step of looking up in one or more second databases the network address of the destination for processing the query message.

10. The method, as set forth in claim 1, wherein the query message forwarding step comprises the step of forwarding the query message to a home location register specified by the network address.

11. The method, as set forth in claim 1, wherein the query message forwarding step comprises the step of forwarding the query message to a short message service center specified by the network address.

12. The method, as set forth in claim 1, wherein the decoding step comprises the step of decoding the global title address in a called party address of the query message.

13. A system for application location register routing, comprising:
   a first cluster of processors adapted for receiving a query message requesting information related to a specific telecommunications customer from a query originator;
   a first database being accessible by the first cluster of processors and having location information of a second database;
   a second cluster of processors co-located with the first cluster of processors and being adapted for receiving at least a portion of the query message from the first cluster of processors, the second cluster of processors being dedicated to process application location register routing; and
   a second database being accessible by the second cluster of processors and having network addresses specifying the destinations of the query messages, the second cluster of processors obtaining the network addresses from the second database and forwarding the network address to the first cluster of processors.

14. The system, as set forth in claim 13, wherein the first and second cluster of processors and the first and second databases reside in a signal transfer point.

15. The system, as set forth in claim 13, further comprising a message transport network coupled to the first and second clusters of processors and adapted for routing messages therebetween.

16. The system, as set forth in claim 13, wherein the second cluster of processors comprises pairs of redundant processors.

17. The system, as set forth in claim 16, wherein one of the pairs of processors is a backup processor of the other processor.

18. The system, as set forth in claim 16, wherein one of the pairs of processors perform in a load sharing manner.

19. The system, as set forth in claim 13, further comprising an administration cluster of processors coupled to the first and second clusters of processors.

20. The system, as set forth in claim 19, wherein the administration cluster of processors is coupled to a service management system.

* * * * *